Nov. 10, 1931.      A. F. VICTOR      1,830,816
SPEED CONTROL DEVICE FOR MOTION PICTURE CAMERAS
Filed Jan. 21, 1929      3 Sheets-Sheet 1
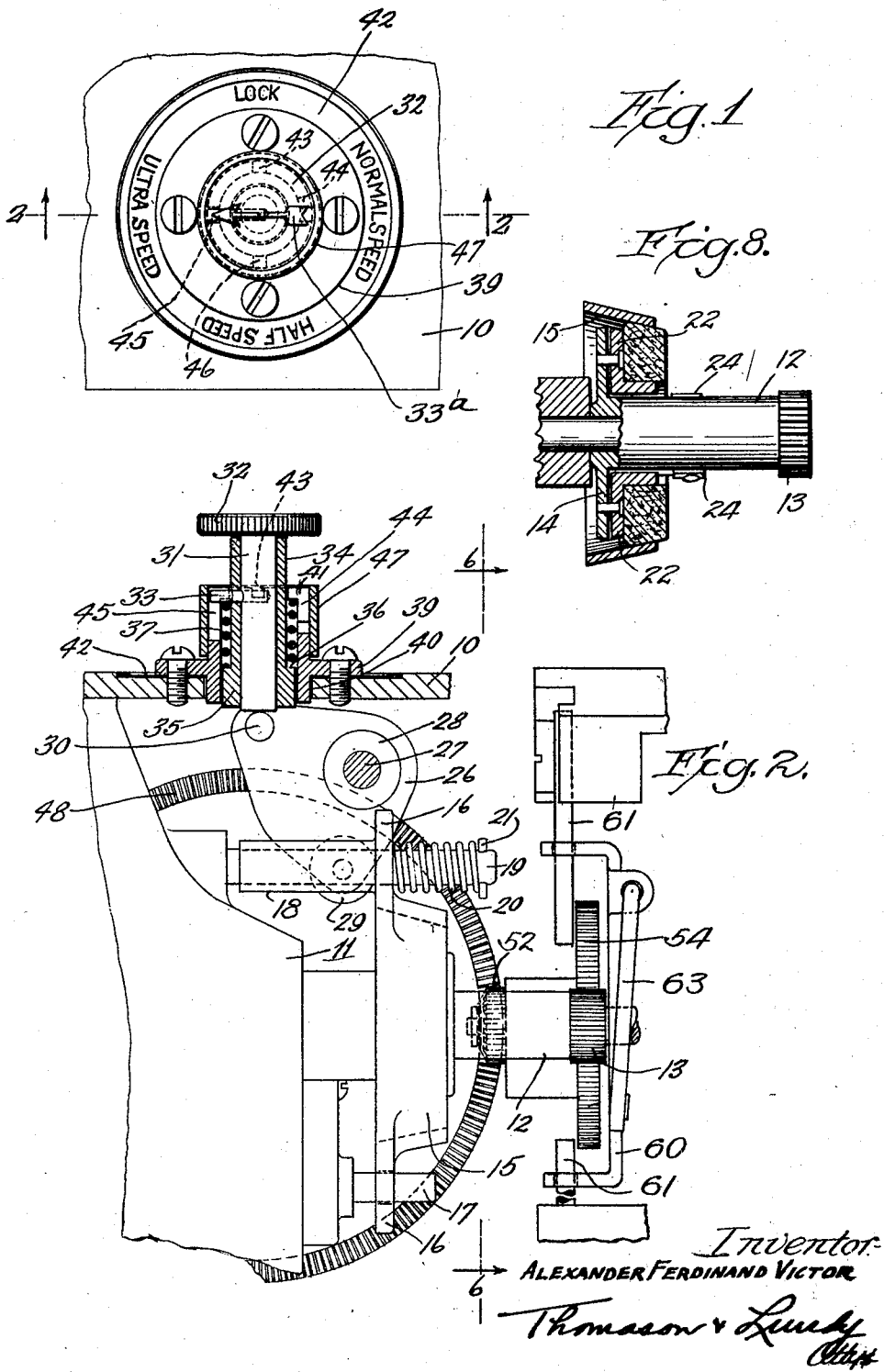
Inventor
ALEXANDER FERDINAND VICTOR
Thomason & Lunsky
Attys Nov. 10, 1931.  A. F. VICTOR  1,830,816
SPEED CONTROL DEVICE FOR MOTION PICTURE CAMERAS
Filed Jan. 21, 1929  3 Sheets-Sheet 2
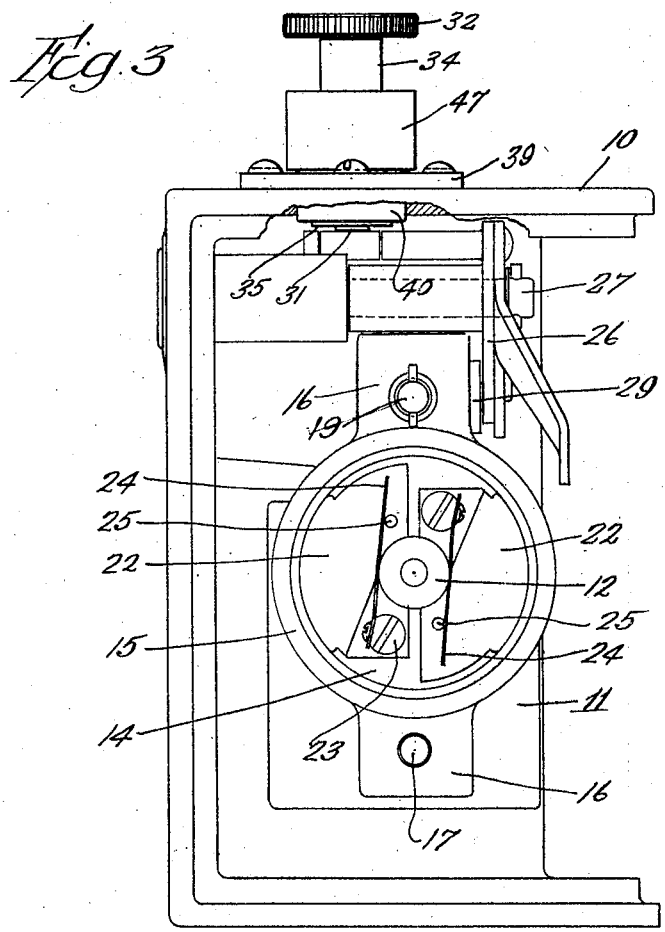
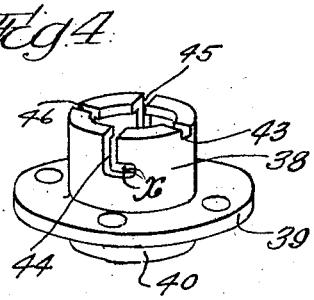
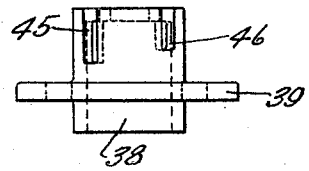
Inventor:
ALEXANDER FERDINAND VICTOR

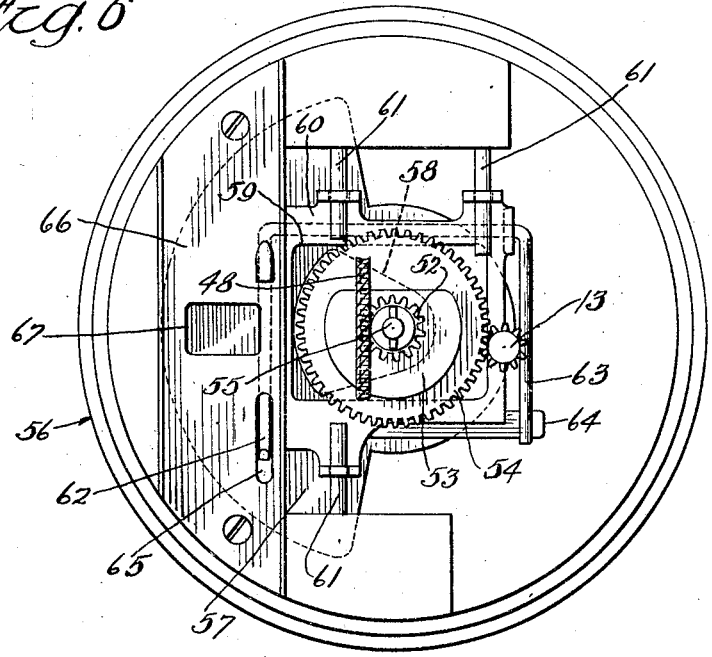

Patented Nov. 10, 1931

1,830,816

UNITED STATES PATENT OFFICE

ALEXANDER FERDINAND VICTOR, OF NEW YORK, N. Y.

SPEED CONTROL DEVICE FOR MOTION-PICTURE CAMERAS

Application filed January 21, 1929. Serial No. 334,067.

My present invention relates to motion picture cameras and the like and has more particular reference to means for controlling the speed at which the driving mechanism travels for imparting motion to the film, so that the latter may be moved at different speeds as desired.

The primary object of the present structure is to provide a single control member, the operation of which alters the speed of the driving mechanism and this control member is capable of ready adjustment to different positions and when placed in such positions the speed of the mechanism will be different in each instance. The single control member, as will be hereinafter ascertained, is in the form of a depressible button or plunger that is provided with a dowel or stop lug that will coact with any one of a plurality of selective guide slots and it is associated with a variable-speed clutch which may be similar to that disclosed in a copending application for letters patent executed even date herewith. It will be understood, however, that the single control member herein disclosed may be coordinated with mechanism other than the suggested structure.

The principal objects of my invention reside in the provision of a control device for motion picture cameras that embodies simplicity and durability of construction, novelty in the arrangement or disposition of the parts, dependability in operation, and economy of manufacture. The device is effective in performing its functions and its structure is such that it may be manufactured at a minimum cost so that it will not increase the retail price of the camera. In its various adjustments the single control device is adapted to (a) lock the film actuating mechanism so as to avoid the accidental releasing of the automatic film feed, (b) to permit the film to be fed at normal speed, (c) permit the feed to be retarded to half normal speed, or (d) to release the mechanism so that the film will travel at ultra-speed for photographing slow-motion pictures. All of the foregoing objects are accomplished through the medium of the structure hereinafter fully described which is more particularly pointed out in the appended claims, and reference is herein made to the accompanying drawings that form a part of this specification.

In the drawings:—

Figure 1 is a top plan, drawn to an enlarged scale, of my single control member.

Figure 2 is a central vertical section taken on line 2—2 of Figure 1 and showing a portion of the driving mechanism that is coordinated with the control member.

Figure 3 is a vertical end elevation of the structure shown in Figure 2 looking at the same from the right hand side thereof.

Figure 4 is a perspective of the guide sleeve for the control member, shown detached.

Figure 5 is an elevation of another portion of the structure shown in Fig. 4.

Figure 6 is a transverse section on line 6—6 of Figure 2 looking in the direction of the arrows and showing the feeding devices.

Figure 7 is an elevation of the power unit housing showing the exterior transmission gearing and associated parts.

Figure 8 is an axial section showing details of the clutch or governor.

The drawings illustrate a typical or preferred form in which my invention may be made, said drawings being somewhat schematic, and throughout the figures the same reference characters have been employed to designate like parts wherever they appear.

The control device and the associated mechanism, while shown enlarged, is adapted for and has been especially designed for installation in small cameras for amateur use wherein the driving motive power is usually in the form of a large clock spring the energy of which is utilized by releasing a latch or other suitable element that will also act as a stop to discontinue movement thereof and arrest the advance of the film. The film is of the miniature type of 16 mm. in width, such as employed in the small cameras and projectors for personal use and is approximately one hundred feet in length.

One of the walls of the camera structure which is designated as 10, is preferably in the form of a flat plate and adjacent the plate or wall is an irregular shaped casting 11 that is so shaped that a portion of the driving mechanism may be mounted thereon. This driving mechanism, as before stated includes a heavy clock spring that is suitably mounted and housed within the casing and is adapted, through any desired transmission mechanism, to actuate the rotatable shaft 12 mounted on the supporting casting 11, the motion of said shaft being derived through the pinion 13 upon its end. A clutch disk 14 is mounted upon the shaft so that it rotates within a friction sleeve made in the form of a movable clutch ring 15, the interior surface of which sleeve or ring is tapered as indicated by dotted lines in Figure 2 so that the clutch ring may be said to be of frusto-conical shape. Apertured ears 16 project radially from diametrically opposite portions of the sleeve or ring, the lower ear being engaged with a guide stud 17 projecting from the supporting casting 11, while the other ear is provided with a tubular extension 18 that is slidably and telescopically mounted upon a spindle 19 projecting from casting 11. A coiled expansion spring 20 surrounds the spindle between the adjacent ear of the ring and a stop pin 21 that is passed through the outer end portion of the spindle 19 so that the clutch ring is normally urged towards the supporting casting 11 and with its base nearest said casting. The friction members of the clutch are in the form of a pair of segmental shoes 22 mounted eccentrically by means of pivot screws 23 upon the clutch disk 14, which shoes are normally urged towards the center of the disk by means of light springs 24 that are mounted upon the pivot screws and extend across the segments to the projections 25 extending laterally from the segments. The working edges of these shoes are segments that conform in shape with the adjacent inner surface of the friction sleeve or clutch ring 15 and when the latter is in its normal position as shown in the drawings there is sufficient friction between these parts to overcome the tendency of the motor or clock-spring and the transmission mechanism to actuate the rotatable element 12 and thus hold the film and its advancing mechanism at rest. When, however, the friction sleeve or clutch ring is moved slightly toward the outer end of rotatable element 12 the clutch shoes 22 will be released slightly and the rotation of the parts takes place. The speed at which the elements and the shoes rotate is controlled by the degree to which the shoes are released and depends upon the space between the edges of said shoes and internal surface of the clutch ring, and it will be understood that the farther these parts are separated the greater the degree of release and the faster the rotatable elements 12 will be moved to advance the film at different speeds. By controlling the adjustment of the clutch ring to certain definite positions, speeds of different velocities may be attained and this adjustment is accomplished through the medium of a single control member and the intermediate structure which co-ordinates it with the clutch ring.

A bell-crank or other suitable cam element 26 is mounted eccentrically upon a fulcrum or pivot 27 projecting from the supporting casting 11, the part 26 being provided with a tubular extension 28 that surrounds the spindle a portion of its length thereby affording an elongated bearing for the cam element. The bell-crank or cam-element is shown as of a triangular shape with its pivotal axis adjacent one of its corners, and at the corner below said pivot there is a roller 29 that is placed with its peripheral edge in engagement with the adjacent surface of the upper ear of the clutch ring 15, which surface is back of that engaged by the spring 20. By moving the cam element in the proper direction the clutch will be moved against the urge of spring 20 and will release the shoes the extent to which the clutch ring is moved. There is a lateral projection in the form of a stud or pin 30 at the third or remaining corner of the cam element 26 that is utilized for the purpose of operating the cam element by means of the single control button or plunger, which latter will now be described.

The control element is in the form of a reciprocable plunger 31 having a disk-like enlargement or button 32 upon its upper end that is provided with an arrow 33ª or other pointer to indicate the position of a guide-pin 33 that projects radially from the shank of said plunger. The lower end of the plunger bears against the cylindrical surface of the projection or stud 30 on the cam element so that the reciprocation of the plunger will rock said cam element. A tubular sleeve 34 surrounds the plunger as seen in Fig. 2 of the drawings and it has an enlarged head 35 on its lower portion so as to provide a shoulder or seat 36 for the lower portion of a coiled expansion spring 37 surrounding the sleeve. The radial guide-pin 33 passes through the sleeve and projects outwardly between the convolutions of the spring 37 in the manner shown in Figure 2 of the drawings. There is a cylindrical bushing 38 surrounding the sleeve, spring and plunger, that has a bore of sufficient diameter to permit of the movement of the parts therein, and said bushing is provided with an annular flange 39 on its lower portion that is apertured to permit it to be secured to the outer surface of the casing wall 10 by means of screws or bolts so that the portion of the bushing below the flange will be positioned in a suitable opening 40 made in the wall adjacent the projection 30 on the cam element. At its upper end the bushing has an inwardly projecting flange 41 that reduces the bore thereof sufficiently to accommodate the portion of the sleeve 34 above its enlargement or head, and flange also provides a retainer for the adjacent end of the spring 37 so that the plunger and its sleeve may be moved outwardly against the urge of said spring and may be rotated in the bushing. Prior to assembly the flanged bushing 38 upon the wall of the camera casing an annular indicia plate 42, of greater diameter than the flange 39, is placed on the surface of the wall and is secured in position when the bushing is clamped in place, said plate 42 having suitable notations thereon as shown in Figure 1 of the drawings which denote the locking of the central element, or the speed at which the film will be advanced upon operating the control element in different rotational positions. The guide pin 33 alines with the head of the pointer or arrow 33$^a$ so that the relative positions of the former may be readily determined by reading the notation to which the arrow points.

With the above described structure the degree to which the clutch members are released is readily controlled by the distance the plunger or button is depressed and as such distances vary according to the speeds desired, provision is made to permit the depression of the button to different positions. By pulling out the plunger or button until the guide pin 33 clears the outer edge of the bushing and then rotating the plunger or button until the pin comes to rest in a small shallow notch or recess 43 in the upper edge of the bushing, the lower end of the control member will be in such position with respect to the projection 30 on the cam element that the latter may not be rocked to release the clutch members. This locks the mechanism against accidental operation. To actuate the film at normal cinematographic speed, the control member may be lifted to disengage the lock notch and then moved until the pin 33 registers with an L-shaped slot or groove 44 in the bushing 38 and then depressed, which will cause the separation of the clutch ring and shoes to a degree that will permit the mechanism to move at the desired normal speed, and if it be desired to continue this speed for a period of time the control member may be rotated slightly so as to position the pin 33 in the lateral portion $x$ of the slot or groove 44. Ultra-speed may be attained by registering the pin 33 with another slot or groove 45 in the bushing that is of greater extent than the other slots or grooves so that when the pin 33 has reached the inner end of said groove 45 the control member will have been depressed to its fullest extent and the clutch ring will have been thereby moved as far as possible away from the shoes to permit the mechanism to move at its fastest speed in order to photograph pictures that are to be projected on the "slow-motion" principle. Other slots or grooves may be produced in the bushing to permit the control member to be depressed different distances in order to attain other speeds for the advance of the film, and in this connection there is shown herein a slot or groove 46 that is of less length than the normal speed slot 44 so that the clutch members will be released to a less extent than desired for normal operation, which will permit the taking of pictures at approximately half-speed. It will be seen the slots or grooves of different lengths and the operator may readily obtain the speed desired by selecting the same with the pointer or arrow 33$^a$ on the control member and then operating the device in the manner herein-before described.

A shield in the form of a cylindrical collar 47, with a bore of approximately the exterior diameter of the bushing, is driven onto the latter and is frictionally held in position to obscure the slots or grooves in the bushing and to prevent foreign matter reaching the slots or grooves and thereby prevent proper operation of the control member.

The transmission or intermediate mechanism mentioned at the beginning of the description actuates the film moving devices and the shutter of the camera through the medium of the structure now to be described and is controlled by the structure hereinbefore explained. A large idle gear 48 derives its motion, through its hub-pinion 49, from a gear 50 that is actuated by the spring motor clock-work housed in a chamber within the camera casing. The idle gear 48 meshes with and actuates a pinion 52 having its axis at a right angle to the axis of the idle gear, and said pinion forms a portion of the counter-balance hub 53 of a gear 54 that meshes with the pinion 13 on the adjacent end of the rotatable shaft 12 with which the clutch governor is associated. Thus, through the above-described intermediaries, the shaft which is controlled by the button plunger, is actuated by the motor and the film feeding mechanism and shutter are interposed between the motor and the control device so as to be under the direct influence of the latter.

The film feeding mechanism may be similar to that disclosed in my co-pending application for Letters Patent executed even date herewith for a "film control device" filed January 21, 1927, Serial Number 334,069. The double gear 52—54 is mounted upon the spindle 55 that projects inwardly from the circular front plate 56 of the camera casing, and the segmental shaped shutter 57 is connected with said gear and also rotates upon said spindle, while intermediate the shutter and gear there is a cam 58 that moves with said elements to actuate the film feed mechanism in synchronism with the shutter.

The cam operates in a rectangular opening 59 made in a slide 60 to reciprocate the latter on the three guides 61; said slide carries the yieldable film-engaging finger or pin 62 that is in the form of an inverted U-shaped wire the transverse or connected portion of which is rockably mounted on the slide so that one of the parallel arms of the U provides the finger 62, with the opposite arm 63 urged away from the casing plate 56 by the spring 64. The end of this film engaging finger 62 is operable in the elongated slot 65 of the aperture plate 66 that forms a portion of the usual film passageway or guide, and when reciprocated the finger engages the marginal perforations in the film to intermittently feed the latter in a downward direction through the passageways and past the aperture 67.

By positioning the guide-pin 33 of the control plunger or button in alinement with the selected slot or groove (44, 45 or 46) in the bushing 38 and then depressing the same, the brake structure will be released to the proper extent to permit the mechanism to move at the selected or predetermined speed thus actuating the film-feeding devices and shutter at a corresponding speed. Thus the film may be moved at any of the predetermined speeds and the operator may select the speed desired by means of a single control element upon the exterior of the casing which of course materially facilitates the use of the camera.

The foregoing detailed description has been given for clearness of understanding only, and no unnecessary limitations should be understood therefrom, but the appended claims should be construed as broadly as permissible in view of the prior art.

What I claim is:—

1. In motion picture apparatus film actuating mechanism, a retarding device controlling the speed thereof, having an axially movable friction sleeve, and means for adjusting said sleeve including a rocking member engaging said sleeve, and a reciprocable plunger for operating said member.

2. In motion picture apparatus film actuating mechanism, a retarding device controlling the speed thereof, having an axially movable friction sleeve, and means for adjusting said sleeve consisting of a bell-crank member, a roller mounted thereon and engaged with said sleeve, and a depressible plunger engaged with a portion of the bell-crank to move the latter when the plunger is depressed.

3. In motion picture apparatus film actuating mechanism, a retarding device controlling the speed thereof, having an axially movable friction sleeve, and means for adjusting said sleeve consisting of a depressible plunger having operative connection with said sleeve, a bushing in which said plunger is mounted and having guides of graduated lengths, and a lateral element on said plunger for engagement with said guides said plunger being bodily rotatable to selectively coact its lateral element with a guide in the bushing, whereby said plunger may be depressed different distances to correspondingly position said sleeve and permit the movement of the mechanism at a predetermined speed.

4. In motion picture apparatus film actuating mechanism, a retarding device controlling the speed thereof, having an axially movable friction sleeve, and means for adjusting said sleeve consisting of a rockable member having connection with said sleeve, a depressible plunger movable longitudinally different distances and rotatable for determining its position for predetermined depressions, and stops arranged radially to the plunger for limiting the amount of depression that may be given to said plunger.

5. A control for motion picture apparatus comprising film moving devices including a driven-shaft, a governor therefor including a friction element and a rotatable centrifugally influenced element actuated therewith, and means for causing relative movement between said elements consisting of a bell-crank having engagement with said friction element to move the latter upon its axis relative to the other element, and a depressible plunger for rocking said bell-crank.

6. A control for motion picture apparatus comprising film moving devices including a driven-shaft, a governor therefor including a rotatable centrifugally influenced element actuated by said shaft, a slidable sleeve coacting with said element, a bell-crank fulcrumed to engage said sleeve, and a reciprocable plunger for rocking said bell-crank.

7. A control for motion picture apparatus comprising film moving devices including a driven-shaft, centrifugally influenced governor shoes mounted on and rotatable with said shaft, a friction sleeve surrounding and engaged by said shoes, a guide spindle on which said sleeve is mounted, a bell-crank having operative connection with said sleeve, and a depressible plunger for rocking said bell-crank to cause the sleeve to change its position relative to said shoes.

8. A control for motion picture apparatus comprising film moving devices including a driven-shaft, centrifugally influenced governor shoes mounted on and rotatable with said shaft, a friction sleeve surrounding and engaged by said shoes, and having its engaging surface tapered towards the axis of the shaft, a guide spindle on which said sleeve is mounted, a bell-crank having operative connection with said sleeve, and a depressible plunger for rocking said bell-crank to cause the sleeve to change its position relative to said shoes.

Signed at Chicago, in the county of Cook and State of Illinois, this 5th day of May, 1928.

ALEXANDER FERDINAND VICTOR.